F. K. LANDGRAF.
METHOD OF APPLYING AND SECURING STAYBOLT SLEEVES TO BOILER SHEETS.
APPLICATION FILED AUG. 21, 1919.
1,352,285. Patented Sept. 7, 1920.
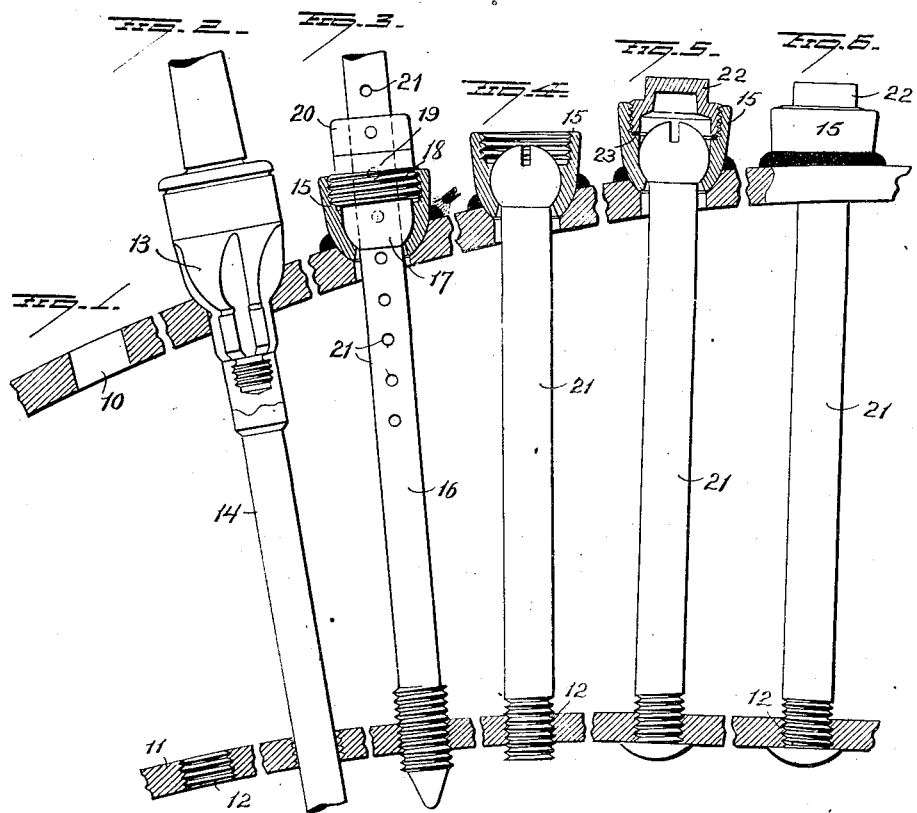

UNITED STATES PATENT OFFICE.

FREDERICK K. LANDGRAF, OF PITTSBURGH, PENNSYLVANIA, ASSIGNOR TO FLANNERY BOLT COMPANY, OF PITTSBURGH, PENNSYLVANIA.

METHOD OF APPLYING AND SECURING STAYBOLT-SLEEVES TO BOILER-SHEETS.

1,352,285.  Specification of Letters Patent.  Patented Sept. 7, 1920.

Application filed August 21, 1919. Serial No. 318,923.

*To all whom it may concern:*

Be it known that I, FREDERICK K. LANDGRAF, a citizen of the United States, and a resident of Pittsburgh, in the county of Allegheny and State of Pennsylvania, have invented certain new and useful Improvements in Methods of Applying and Securing Staybolt-Sleeves to Boiler-Sheets; and I do hereby declare the following to be a full, clear, and exact description of the invention, such as will enable others skilled in the art to which it appertains to make and use the same.

My invention relates to an improved method of applying and securing stay bolt sleeves to boiler sheets.

In one type of flexible stay bolt assemblage, the sleeve for the stay bolt head is adapted for universal adjustment in the outer sheet of the boiler and is secured after adjustment by welding.

In assembling the parts the sleeve should be placed with its long axis parallel with the long axis of the bolt that is to be seated therein so that the latter will have equal clearance all around at the inner end of the sleeve and in the reamed part of the hole in the outer sheet, but it is an extremely difficult operation to so seat the sleeve and hold it while welding it to the sheet and the object of my invention is to overcome this difficulty and render the correct assemblage of the sleeve to the outer sheet comparatively easy, and with the positive assurance that the sleeve will be in the proper relative position to the bolt when the latter is applied.

In the accompanying drawings; Figure 1 shows the outer sheet punched or drilled; Fig. 2 shows it reamed and recessed and the reaming and recessing tool in place; Fig. 3 shows the sleeve held in place during the welding; Fig. 4 shows the bolt applied; Fig. 5 shows the cap in place and Fig. 6 a view in elevation of the completed installation.

In applying the bolts, the outer sheet is punched or drilled as at 10, at the proper points for the bolts, and the inner sheet 11 has a threaded hole 12 for each bolt. After the holes in the outer sheets have been punched or drilled they are reamed and recessed as shown in Fig. 2 by a tool 13 which latter has a smooth cylindrical stem 14 adapted to pass through the corresponding opening 12 in the inner sheet 11. This stem 14 holds the reaming and recessing tool 13 in proper position with relation to the hole 10, so that when finished the recess will properly support the sleeve 15 with its long axis parallel with the reamed wall of the hole through the outer sheet and also parallel with the long axis of the bolt to be inserted in said sleeve. After the hole has been reamed and recessed by a recessing tool 13 having the same external dimension and curvature as the inner end of the sleeve 15, the latter is applied and centered by the holding bar 16. This bar is threaded at its inner end to engage the threaded hole 12 in the inner sheet 11, and is provided with a head 17 preferably shaped to conform to the inner surface of the sleeve and make a close fit with the latter. This head is loosely mounted on the bar 16 so as to provide for varying distances between the two sheets, and is provided with externally threaded portion 18 to engage the internal threads on the sleeve, and at its outer end with a collar 19 against which the clamping sleeve 20 adjustably fixed to the bar 16 is adapted to bear, the latter being provided with a series of holes 21, whereby the sleeve 20 may be locked by a pin passing through the hole in the clamping sleeve and also through a hole in the bar. In assembling these parts the head 17 is applied to the sleeve and the end of the bar 16 is passed and screwed into the hole 12 in the inner sheet. As the sleeve 15 is supported against movement it will be evident that when the bar 16 has been screwed into the hole in the inner sheet, the sleeve 15 when fully seated in the recess in the outer sheet, will have its long axis parallel with the long axis of the bar 16 and also with the bolt that will be inserted in the sleeve 15 after the latter has been secured to the sheet.

By turning the bar 16 in a direction to screw it into the hole in the inner sheet the clamping sleeve 20 on the holding bar 16 will bear against collar 19 on the head 17 and thus hold the latter and the bolt sleeve 15 in absolutely correct position against the possibility of any movement and while so held, it is welded to the outer sheet, as shown in Fig. 3. After the completion of the welding operation the bar 16 and its head are removed and the bolt 21 inserted and its inner end upset as shown in Fig. 5.

The sleeve is closed by the cap 22, which with the gasket 23 on which the cap bears, forms a steam tight seat for the sleeve.

With this method of applying the sleeve 15 there is no uncertainty whatsoever as to its correct position on the outer sheet as it is automatically seated in its recess in the outer sheet by the application of the bar 16 and is so held throughout the welding operation.

Having fully described my invention what I claim as new and desire to secure by Letters-Patent, is:—

1. The method of applying and securing stay bolt sleeves to the outer sheet of a boiler consisting in properly placing the sleeve on and clamping it to said outer sheet by means engaging the sleeve and passing through the bolt holes in both sheets, and welding the sleeve while so held.

2. The method of applying and securing stay bolt sleeves to the outer sheet of a boiler consisting in recessing the outer sheet to form a seat for the curved end of the sleeve, mounting the curved end of the seat in said recess and properly adjusting it therein by means passing through the sleeve and through both sheets of the boiler, and welding the sleeve to the sheet while it is so held.

3. The method of applying and securing a stay bolt sleeve to the outer sheet of a boiler consisting in first forming a bolt hole in the inner and outer sheets, recessing the outer sheet at a bolt hole by a tool guided and held in place by its engagement with the corresponding bolt hole in the inner sheet, applying the sleeve to the recess and centering it and holding it therein by a tool engaging the sleeve and the inner sheet and welding the sleeve to the outer sheet while it is held by said tool.

4. The method of applying and securing stay bolt sleeves to the outer sheet of a boiler consisting in forming a bolt hole through both sheets and recessing the hole in the outer sheet by a tool guided by its engagement with the bolt hole in the inner sheet, applying the sleeve to the recess and adjusting and holding it in said recess by a tool attached to the sleeve and secured to the inner sheet, and welding the sleeve to the sheet while it is clamped to the latter by said adjusting tool.

5. The method of applying and securing a stay bolt sleeve to the outer sheet of a boiler consisting in forming a bolt hole in each sheet, mounting the sleeve on the outer sheet and adjusting and holding it therein by a tool rigidly secured to said sleeve and passing through the bolt hole in the inner sheet and then welding the sleeve to the seat.

In testimony whereof I have signed this specification in the presence of a subscribing witness.

FREDERICK K. LANDGRAF.

Witness:
EDWIN S. RYCE.